United States Patent [19]

Crouse

[11] Patent Number: 4,852,229

[45] Date of Patent: Aug. 1, 1989

[54] SELF-LOADING CONTROLLED DEFLECTION ROLL

[75] Inventor: Jere W. Crouse, Beloit, Wis.

[73] Assignee: Beloit Corporation, Beloit, Wis.

[21] Appl. No.: 256,016

[22] Filed: Oct. 11, 1988

[51] Int. Cl.⁴ .............................................. B21B 31/32
[52] U.S. Cl. .................................. 29/116.2; 29/113.1; 29/113.2; 29/116.1; 72/243
[58] Field of Search ................. 29/113.1, 113.2, 116.1, 29/116.2, 129; 72/243, 245; 100/162 B; 26/104

[56] References Cited

U.S. PATENT DOCUMENTS

| | | | |
|---|---|---|---|
| 3,070,872 | 1/1963 | Ulrichs et al. | 29/113.2 |
| 3,430,319 | 3/1969 | Skaugen | 29/116.2 |
| 3,587,152 | 6/1971 | Hold | 29/116.2 |
| 3,736,636 | 6/1973 | Tawa | 26/104 |
| 3,802,044 | 4/1974 | Spillmann et al. | 29/113.2 |
| 3,919,753 | 11/1975 | Lehmann et al. | 29/116.2 |
| 4,328,744 | 5/1982 | Pav et al. | 29/116.2 X |
| 4,520,723 | 6/1985 | Pav et al. | 100/162 B |

*Primary Examiner*—Timothy V. Eley
*Assistant Examiner*—Peter Dungba Vo
*Attorney, Agent, or Firm*—Dirk J. Veneman; Raymond W. Campbell; Gerald A. Mathews

[57] ABSTRACT

A self-loading type of controlled deflection roll has two sets of opposed, hydraulically actuated pressure shoes extending along its length. Each set of opposed pressure shoes is arrayed in a plane and the two planes intersect perpendicularly with their line of intersection coincident with the longitudinal axis of the roll. The distance from the surface of the beam on one pair of opposite sides to its longitudinal axis for one set of pressure elements is less than the corresponding distance on the other pair of opposite sides for the other set of pressure elements. The self-loading roll is intended to be brought into nipping engagement with another roll. The center support beam rotates in conjunction with a corresponding retraction of the pressure shoes in the oncoming direction toward the intended nip-line of engagement with another roll. This permits the rotatable shell of the self-loading roll to be supported at a lower position relative to the longitudinal axis of the roll. This creates a gap between the controlled-deflection roll and its mating roll. Continued rotation of the self-loading roll causes the next set of oncoming pressure shoe(s) to rotate toward the nip-line of contact between the rolls.

10 Claims, 3 Drawing Sheets

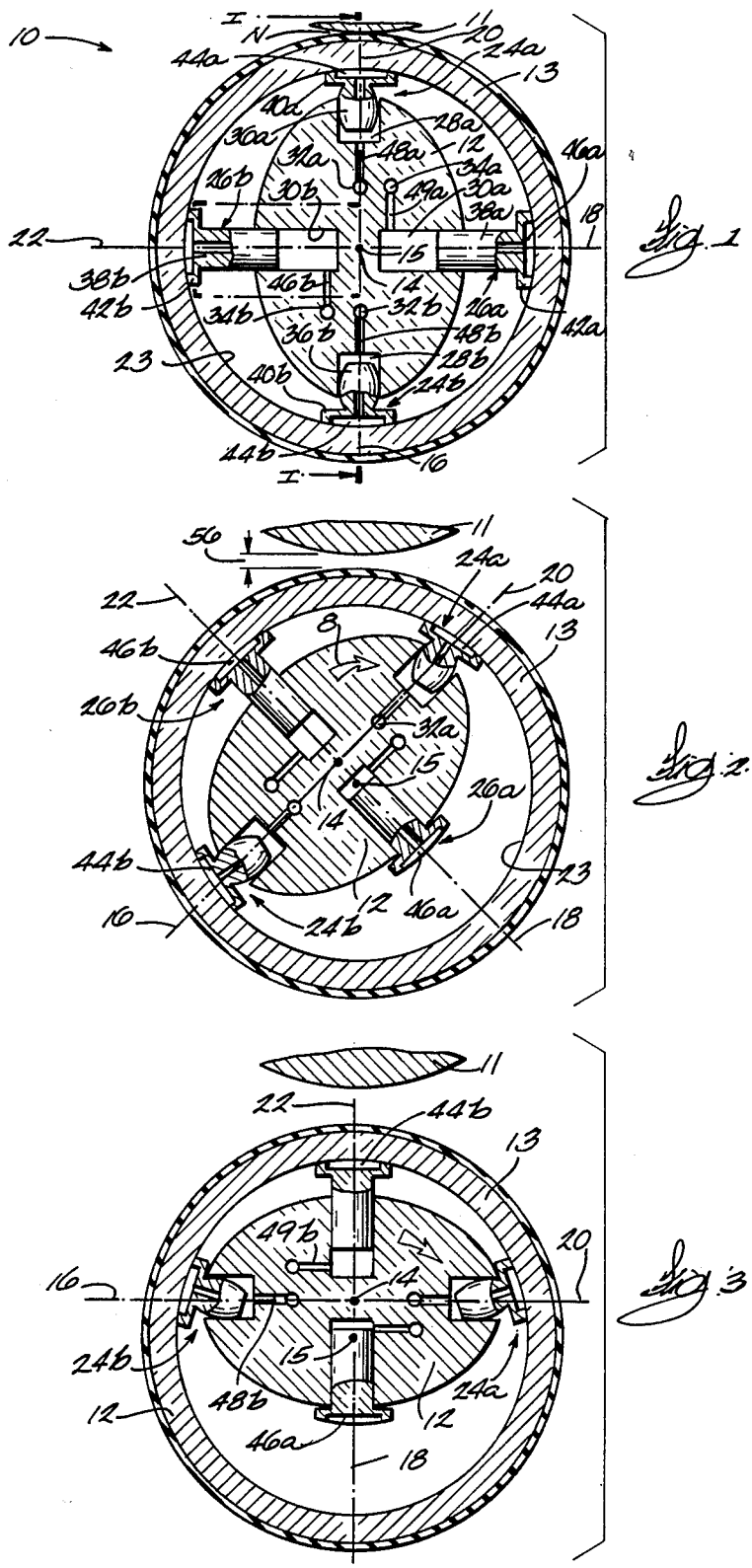

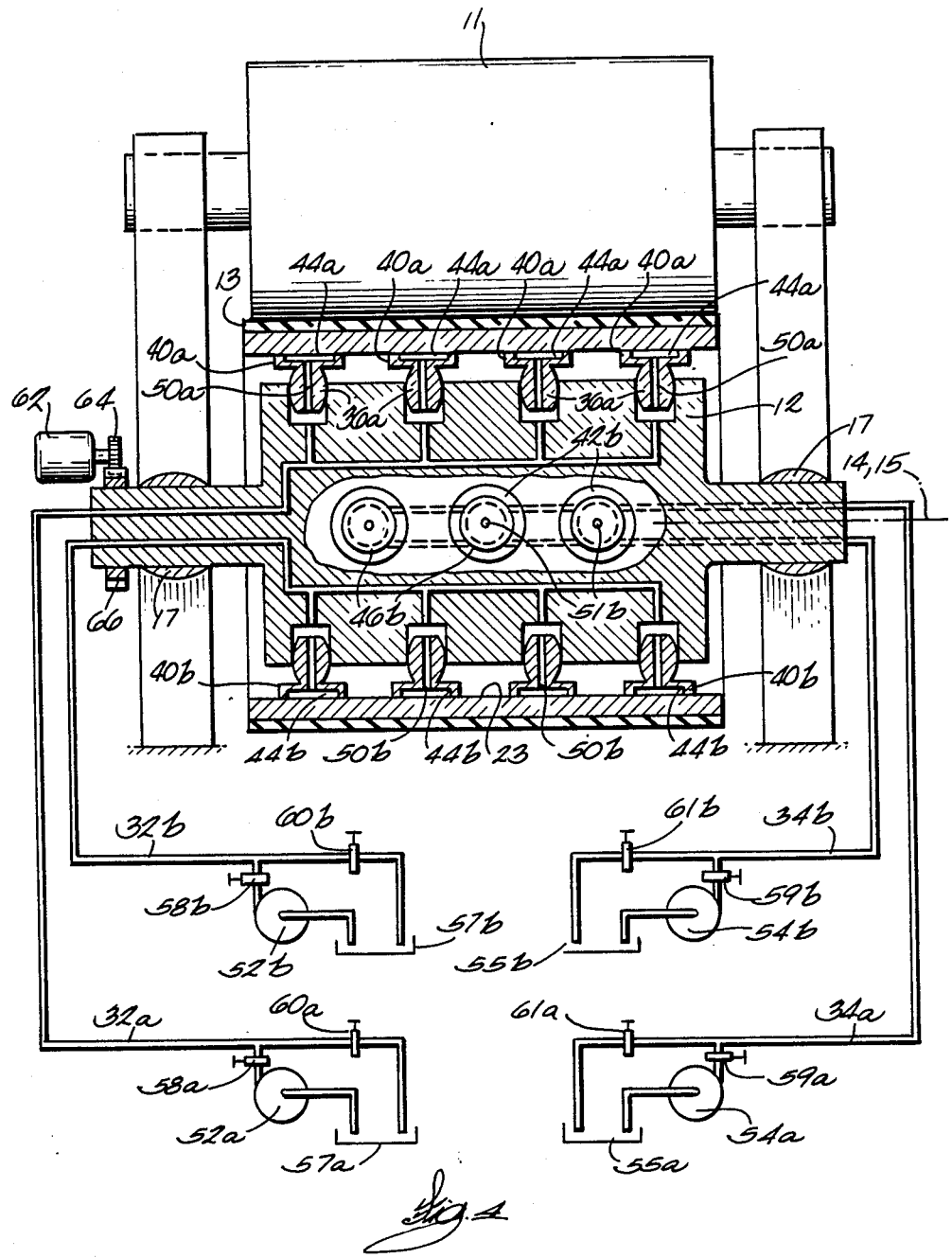

SELF-LOADING CONTROLLED DEFLECTION ROLL

BACKGROUND OF THE INVENTION

This invention relates to a controlled deflection roll. More particularly, this invention relates to a self-loading type of controlled deflection roll wherein the roll is capable of being moved into and out of nipping engagement with another roll without having to move the support shafts of either roll toward the other roll. Such rolls are very useful in the papermaking industry where it is desirable, and necessary, to create a gap of up to several inches between rolls which otherwise are engaged in a nip-line of contact during normal operation.

The creation of such a gap is important during the papermaking process in order to change the felt in a press section of a papermaking machine as well as to remove wads of paper which might accumulate during a sheet break or other interruption of the travel of the paper web. Such interruptions are also often encountered during the operation of calendar stacks, and this type of roll is useful there as well.

Other types of self-loading controlled deflection rolls are known. Examples are shown and described in U.S. Pat. Nos. 3,885,283; 4,249,290 and 4,213,232. The purpose of all self-loading types of controlled deflection rolls is the same, and that is to move the roll shell radially relative to the axis of the roll without use of external support arms. This greatly simplifies mounting the controlled deflection roll in a papermaking machine as well as reduces the space required.

Prior self-loading controlled deflection rolls operate by utilizing a stationary center shaft, or support beam, over which the roll shell is translationally movable and supported on hydraulically actuated support elements, or shoes. The roll shell is rotatably supported on a ring which also moves translationally relative to the support beam. The ring is guided in its movement by parallel surfaces which slide over corresponding surfaces on the shaft.

SUMMARY OF THE INVENTION

In this invention, no roll shell rotational support ring is necessary or utilized. Two longitudinally extending sets of diametrically opposed support elements are mounted in the support beam to support the roll shell on the beam. The support elements are disposed along two intersecting, perpendicular planes to provide four longitudinally extending support elements, or sets of support elements, positioned at 90° intervals about the periphery of the beam. The line of intersection is coincident with the longitudinal axis of the roll in operating position. These outwardly arrayed support elements disposed at 90° intervals about the axis of the roll shaft provide uniform support of the roll shell in all positions.

The self-loading function is accomplished by rotating the support beam within the roll. The two opposed sets of support elements guide and support the roll shell continuously on at least three of the sets of support elements during rotation of the support beam. The support beam is oblong in elevational cross-sectional shape so the set of support elements on both the longer pair of opposite beam sides is closer to the longitudinal axis of the support beam than the set of support elements on both the shorter pair of opposite beam sides.

This arrangement of support beam shape and opposed sets of support elements permit the portion of the roll shell over those support elements which are closer to the longitudinal axis of the support beam to move closer to the longitudinal axis when the support beam is rotated. Since the longitudinal axis of the support beam does not itself move relative to the mating roll, such rotation of the support beam and consequent retractive movement of the roll shell creates a gap between the peripheries of the two rolls. The size of the gap is the difference between the amount of travel of two circumferentially successive sets of support elements in their mutually perpendicular planes through the longer and shorter beam sides.

The roll shell is both rotationally and translationally supported solely by the support elements which can take the form of either hydrostatic or hydrodynamic shoes, both types being hydraulically actuated as is well known in the art. No separate bearing ring is required or used to mount and translationally guide the roll shell.

Accordingly, it is an object of this invention to provide a self-loading type of controlled deflection roll.

Another object of this invention is to provide a self-loading type of controlled deflection roll having a rotatable roll shaft.

A feature of this invention is the provision of two pairs of opposed support elements, or sets of support elements, arranged in perpendicular planes to provide support for the roll shell wherein the intersection line of the planes is coincident with the longitudinal axis of the roll support shaft.

Still another feature of this invention is the provision of a self-loading type of controlled deflection roll wherein the roll shell is rotatably supported solely by support elements mounted on the roll shaft.

These, and other objects, features and advantages of this invention will be more readily discerned by those skilled in the art upon reading the description of the preferred embodiment in conjunction with the attached figures.

BRIEF DESCRIPTION OF THE DRAWINGS

FIG. 1 is an elevational cross section view of the self-loading controlled deflection roll in nipping engagement with its mating roll.

FIG. 2 is an elevational cross section view of the self-loading controlled deflection roll wherein the support beam has rotated about 30° clockwise to open a gap between it and its mating roll.

FIG. 3 is an elevational cross section view of the self-loading controlled deflection roll wherein the support beam has rotated 90° from its position shown in FIG. 1 at which point the gap between the rolls is at its greatest.

FIG. 4 is a side-elevation view, partially in section along section line I—I in FIG. 1, of the self-loading controlled deflection roll and which illustrates the pressure elements supporting the roll shell.

DESCRIPTION OF THE PREFERRED EMBODIMENT

Figure 5B:
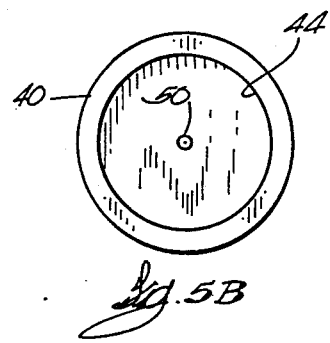
FIGS. 5A, 5B, 5C show, respectively, a sectional elevational view of a piston and shoe, a top view of the shoe face and a bottom view of the type of piston shown in FIGS. 1–4.

As shown in FIG. 1, a self-loading controlled deflection roll 10 has an oblong support beam, or shaft, 12 having a longitudinal axis 14. A roll shell 13 is disposed about the beam. The oblong support beam has two transverse axes 16,18 which intersect the longitudinal axes 14 and each other. Its longer cross-sectional transverse axis 16 is disposed in the 12 o'clock—6 o'clock positions. Similarly, the shorter transverse axis 18 is disposed in the 3 o'clock—9 o'clock positions. Corresponding longitudinally extending planes 20,22 pass through these axes 16,18 with the line of intersection of the perpendicular planes coinciding with the longitudinal axis 14 of the support beam 12. Thus, in the configuration shown in FIG. 1, longitudinally extending planes 20,22 are coincident with axes 16,18 respectively.

In the following description, corresponding elements are correspondingly numbered with small case letters used as suffixes to distinguish between individual ones of the elements.

Support beam 12 is shown in elliptical cross section, but it could just as well have a rectangular cross-sectional shape. What is significant about the support beam is the fact that the one or more roll shell support elements 24a, 24b in the 12 and 6 o'clock positions are disposed further from the adjacent surface of the support beam than are the one or more roll shell support elements 26a, 26b in the 3 and 9 o'clock positions when the support beam and roll shell are in the positions shown in FIG. 1. In this regard, the roll shell support elements 24a, 24b in the 12 and 6 o'clock positions are mounted to be equidistant from the longitudinal axis 14. Since they are also mounted along plane 20 having the longer of the mutually perpendicular cross-sectional axes 16,18, their distance of travel between the inner surface 23 of the roll shell to the support beam is relatively small. Stated another way, the cross-sectional shape of the support beam is not important so long as the support beam has major and minor transverse axes, such as axes 16,18, respectively.

In a corresponding manner, the sets of support elements 26a, 26b in the 3 and 9 o'clock positions of plane positions of plane 22 have a greater stroke distance between the inner 22 have a greater stroke distance between the inner surface of the roll shell and the beam. This geometry and relationship between the various roll shell support elements and the support beam permit the 3 o'clock and 9 o'clock position support elements 26a, 26b, as shown in FIG. 1, to retract toward the axis 14 of the beam a distance greater than can the roll shell support elements 24a, 24b disposed in the 12 o'clock and 6 o'clock positions.

The roll shell 13 is supported with its longitudinal axis of rotation 15 coincident with axis 14 in FIG. 1 with each of the plurality of roll shell support elements 24a, 24b, 26a, 26b biased outwardly against the inner surface of the roll shell by pressurized hydraulic fluid supplied to piston cavities 28a, 28b, 30a, 30b via conduits 32a, 32b, 34a, 34b which pressurably urge piston members 36a, 36b, 38a, 38b outwardly to push the shoes 40a, 40b, 42a, 42b against the inner surface of the roll shell 13.

The roll shell support elements can take either of two basic configurations. In one configuration, shown in more detail in FIGS. 4 and 5A, 5B, 5C, each set of roll shell support elements comprise a plurality of aligned shoes 40a, 40b, 42a, 42b on each side of the beam, each shoe having a cavity 44,46 in its face which extends toward the inner surface of the roll shell. Each shoe is supported by a piston 36,38 which is slidably received in a corresponding cylinder 28,30 in the support beam. A source of pressurized hydraulic fluid is supplied by pumps 52,54 to each cavity 28,30 via conduits 32,34 and riser tube 48,49. At least one capillary tube 50,51 extends through each piston from the piston cavity, or cylinder, 28,30 beneath the piston to the cavity 44,46 in the face of the shoe to provide pressurized fluid to the shoe whereby the shoe can establish hydrostatic supporting force to the inner surface of the roll shell. An example of a hydrostatic shoe so used in a controlled deflection roll is shown in U.S. Pat. Re. No. 26,219.

Figure 6B:
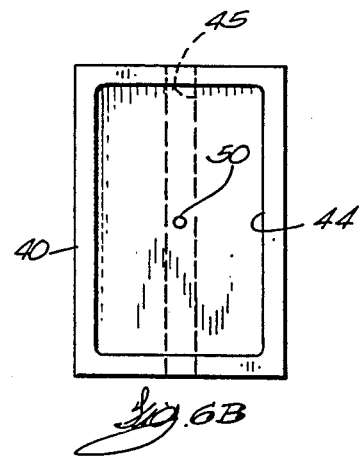
FIGS. 6A, 6B, 6C show, respectively, a sectional elevational view of another type of piston and shoe, a top view of the shoe face, and a bottom view of the piston.
Figure 5A:
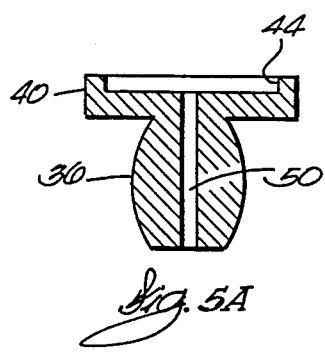
Figure 6A:
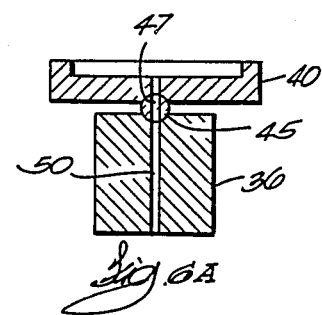
Figure 5C:
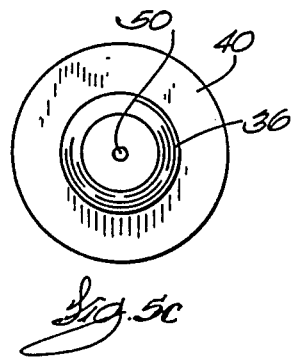
Figure 6C:
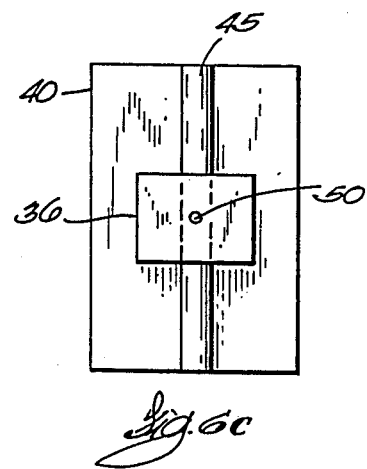

Another form of the sets of support elements 24,26 is in the form of an elongated shoe which extends along the inner surface of the roll shell in the longitudinal direction for substantially the entire working face of the roll shell. This configuration is shown in FIGS. 6A, 6B, 6C wherein the shoe 40 is elongated in the direction of the longitudinal axis of the roll. A pivot rod 45, through which a hole 47 is drilled, links the cavity 44 in the face of the shoe with the capillary tube 50 in the piston to provide pressurized hydraulic fluid to the shoe face cavity at the interface between the shoe and inner surface of the roll shell. In this arrangement, the shoe pivots on the pivot rod instead of the piston having to pivot. Otherwise, operation is the same as described above in conjunction with the circular shaped shoes. The sets of support elements along planes 20,22 thus comprise the single shoe on either side of the beam. Beneath the elongated shoe is a corresponding elongated piston which is slidably mounted in an elongated trough, or cavity, in the support beam in much the same manner as the pistons previously described.

A variation in the type of support shoe utilizes an elongated shoe similar to that shown in FIGS. 6A, 6B, but which has no cavity in the shoe face and utilizes no capillary tube, or other means, to hydraulically link the shoe face with pressurized hydraulic fluid from beneath the piston. This type of roll shell support arrangement is hydrodynamic in nature in that the roll shell support forces are provided by a film of hydraulic fluid which travels about the inner periphery of the roll shell and produces a hydrodynamic force between the face of the shoe and the inner periphery of the roll shell. In the hydrodynamic form of roll shell support, no supply of pressurized fluid need be introduced through any capillary tubes in the shoes or pistons. An example of a hydrodynamic shoe in a controlled crown roll is shown in U.S. Pat. No. 3,276,102.

A variation of the hydrodynamic support element arrangement resides in the use of a single, long shoe which extends beneath the effective face length of the roll. The shoe is supported by a series of pistons coextending with the shoe. Each of the pistons can be individually actuated with pressurized fluid to provide zone controlled support forces at positions along the length of the roll corresponding to the positions of the pistons.

Both of these basic forms of roll shell support elements (static and hydrodynamic) are well known in the controlled deflection roll art and will not be described further inasmuch as they form no part of the invention per se. The piston members 36,38; shoes 40,42; piston cavities 28,30; shoe face cavities 44,46; riser tubes 48,49 and capillary tubes 50,51 (linking the pressurized hydraulic fluid with the piston members) are collectively known as the support elements 24,26.

Referring to FIG. 2, the support beam 12 has rotated clockwise about 30° in its support bushing, or bearing, 17 as shown by directional arrow 8. The roll shell support elements in the 9 o'clock position along plane 22 has retracted somewhat into the support beam with the result that the section of the roll shell over that support elements 26b has moved radially inwardly toward the longitudinal axis 14. This movement produces a gap 56 between the self-loading controlled deflection roll 10 and its mating roll 11.

With reference to FIG. 3, continued rotation of support beam 12 so that axis 16 is 90° from its position in FIG. 1 results in the portion of roll shell 13 over support elements 26b moving downwardly toward the surface of the support beam. The axis 15 of roll shell rotation is thus noncoincident with the longitudinal axis 14 of the support beam and beneath axis 14 a distance equal to the gap 56 which, in this position of the support beam, is at its greatest magnitude.

FIG. 4 illustrates the controlled deflection roll in a side-elevational view and showing the hydraulic conduits linked with a pressurized fluid source, such as pumps 52a, 52b, 54a, 54b and corresponding valves 60a, 60b, 61a, 61b. While the individual pressure elements, as depicted by hydrostatic shoes 40,42, are shown in staggered array in the support beam 12 for purposes of better illustration, the individual pressure shoes 40a, 40b, 42a, 42b can just as well be aligned circumferentially.

In operation, a motor 62 is linked to the support beam, or shaft, 12 by a pinion 64 meshed with a drive gear 66 secured to the shaft. The individual conduit lines 32,34 are flexibly mounted to the shaft in a known manner and provide for pressurized hydraulic fluid from the pumps 52a, 52b, 54a, 54b. As the motor rotates the support beam through the positions as shown in FIGS. 2 and 3, hydraulic fluid in cavity 30b is permitted to reverse direction in its conduit by opening a valve 61b and closing valve 59b. The returning hydraulic is then directed to sump 55b. This permits the corresponding shoe 42b to retract and the roll shell to be lowered to the position shown in FIGS. 2 and 3 to create the gap 56. Thus, when the pistons 38 are being rotated toward the nip N between rolls 10,11, the hydraulic pressure in the corresponding cavities, or cylinders, 30 is relieved through valves 61 to effect the action of lowering the roll shell over the shorter transverse axis 18. Similarly, valves 60 controlling the relief pressure in cavities, or cylinders, 28 control the hydraulic pressurization to the support elements 24 along the longer transverse axis 16 to provide adequate hydraulic pressurization of them in the position shown in FIG. 3. When the pressure in these cylinders is relieved to permit their pistons to retract, valves 60 are opened and valves 58 are closed. The returning hydraulic fluid is then directed to sumps 57. In other words, the hydraulic pressurization, and relief thereof, of support elements 24,26 is coordinated through pumps 52,54 and valves 58, 59, 60, 61 to permit the pressure elements to maintain support of the roll shell while permitting the roll shell to move downwardly over the support beam to create the gap between the mating rolls as desired.

The support beam can either be rotated in a single direction to effect alternate opening and closing of the nip, or its direction can be reversed from the position shown in FIG. 3 to rotate back into the position shown in FIG. 1. Especially in the alternative where the direction of the support beam is reversed, it is conceivable that fewer than four rows of support elements would be needed due to the lack of a need to support the roll shell on the side opposite to the side on which faces the nip with the mating roll. In such a case, the opposing support elements in the general direction of the major axis would not necessarily have to be in the same plane, but could be offset slightly.

Regardless of the manner in which the support beam, or shaft, 12 is rotated, the pressurization and depressurization of the cavities 30a,30b is conducted by either supplying pressurized hydraulic fluid through the conduits 32,34 or opening the appropriate valves 60a, 60b, 61a, 61b and permitting the hydraulic fluid to return to allow the appropriate support element to move toward the support beam to permit the roll shell to move away from its mating roll to create the gap. When valves 60,61 are opened, valves 58,59 are closed to prevent fluid from flowing back into the pumps.

At all times during operation, the self-loading controlled deflection roll is supported on at least three of the support elements disposed at 90° intervals about the circumference of the support beam. Further, as shown in FIG. 4, the pistons 36,38 can tilt in their cavities, or cylinders, 28,30, as shoes 24a, 24b follow the contour of the inner surface of the roll shell to provide better support during operation.

Thus, a self-loading controlled deflection roll has been disclosed which achieves the objectives and incorporates the features set forth. Naturally, various modifications and variations of the preferred embodiment shown and described will be readily perceived by those skilled in the art. Accordingly, the invention is intended to be limited only by the scope of the claims. One such modification is to mount the pistons to move reciprocally while permitting the shoes to tilt on top of the pistons.

What is claimed is:

1. A self-loading controlled deflection roll for engaging a mating roll along a nip line of contact therebetween and disengaging therefrom, comprising, in combination:

a support beam having longitudinal and major and minor axes, the major and minor axes extending through the longitudinal axis and transverse thereto;

support means rotatably supporting the support beam about its longitudinal axis;

a roll shell disposed about the support beam;

roll shell support element means extending longitudinally along the beam surface, said support element means comprising at least three sets of support element means with two sets disposed in substantially opposed array extending along corresponding areas of the surface in a plane through the major axis and along the longitudinal axis, and another set extending along the surface in a plane through the minor axis and along the longitudinal axis whereby the roll shell is supported by at least three sets of support element means; and drive means operatively connected to the support beam for selectively rotating the support beam to bring the support element means along the major and minor axes out of, and into, alignment with the nip line of contact and longitudinal axis to effect radial movement of the roll shell relative to the longitudinal axis into nipping engagement and out of nipping engagement according to alignment of the support element means along the major and minor axes with the nip, respectively.

2. A self-loading controlled deflection roll as set forth in claim 1, further including:
fluid support means including a first source of hydraulic fluid for selectively providing pressurized fluid to the support element means along the major axis and for relieving the fluid pressure to provide radial force and relief between the support elements and the roll shell;
a second source of hydraulic fluid for selectively providing fluid pressure and relief to the support element means along the minor axis to support the roll shell at selected radial positions along the minor axis relative to the longitudinal axis; and
whereby the support element means along the major and minor axes are selectively pressurized and relieved to effect radial movement of the roll shell outwardly and inwardly relative to the nip line as desired.

3. A self-loading controlled deflection roll as set forth in claim 2, wherein:
the fluid support means includes pump means, sump means, conduit means for establishing fluid communication between the pump means and the support element means and valve means for selectively permitting pressurized fluid to flow from the pump means along the conduit means to the support element means and to be relieved along the conduit means into the sump means.

4. A self-loading controlled deflection roll as set forth in claim 1, wherein:
the elevational cross-sectional end shape of the beam is in the form of an ellipse.

5. A self-loading controlled deflection roll as set forth in claim 1, wherein:
the support element means comprise shoe means having a face for engaging the inner surface of the roll shell, piston means, a cavity in which the piston means is slidably mounted and conduit means linking the cavity means with a source of pressurized fluid.

6. A self-loading controlled deflection roll as set forth in claim 1, wherein:
the support element means includes an opposed set of support elements facing outwardly along the major axis.

7. A self-loading controlled deflection roll as set forth in claim 1, wherein:
the major and minor axes, and the planes extending through them and along the longitudinal axis of the roll, are mutually perpendicular.

8. A self-loading controlled deflection roll for engaging a mating roll along a nip line of contact therebetween and disengaging therefrom, comprising, in combination:
a support beam having longitudinal and major and minor axes, the major and minor axes being perpendicular to one another through the longitudinal axis and transverse thereto;
support means rotatably supporting the support beam about its longitudinal axis;
roll shell support element means extending longitudinally along the beam surface, said support element means comprising four sets of support element means with two sets disposed in substantially opposed array extending outwardly along the beam surface, each of the opposed two sets in planes through the major and minor axes and along the longitudinal axis, whereby the roll shell is supported by at least three sets of support element means disposed angularly about the longitudinal axis at 90° intervals; and
drive means operatively connected to the support beam for selectively rotating the support beam to bring the support element means along the major and minor axes out of, and into, alignment with the nip line of contact and longitudinal axis to effect radial movement of the roll shell relative to the longitudinal axis into nipping engagement and out of nipping engagement according to alignment of the support element means along the major and minor axes of the nip, respectively.

9. A self-loading controlled deflection roll for engaging a mating roll along a nip line of contact therebetween and disengaging therefrom, comprising, in combination:
a support beam having longitudinal and major and minor axes, the major and minor axes being angularly displaced relative to one another through the longitudinal axis and transverse thereto;
support means rotatably supporting the support beam about its longitudinal axis;
roll shell support element means extending longitudinally along the beam surface, said support element means comprising four sets of support element means with two sets disposed in substantially opposed array extending outwardly along the beam surface, each of the opposed two sets in planes through the major and minor axes and along the longitudinal axis, whereby the roll shell is supported by at least three sets of support element means disposed angularly about the longitudinal axis;
a first source of hydraulic fluid for selectively providing pressurized fluid to, and relieving pressurized fluid from, the support element means along the major axis;
a second source of hydraulic fluid for selectively providing pressurized fluid to, and relieving pressurized fluid from, the support element means along the minor axis;
whereby the roll shell is supported and moved radially at selected positions along the major and minor axes and relative to the longitudinal axis of the support beam, and is thereby selectively brought into, and out of, nipping engagement with the mating roll; and
drive means operatively connected to the support beam for selectively rotating the support beam to bring the support element means along the major and minor axes out of, and into, alignment with the nip line of contact and longitudinal axis to affect the radial movement of the shell relative to the longitudinal axis into nipping engagement and out of nipping engagement according to alignment of the support element means along the major and minor axes of the nip, respectively.

10. A self-loading controlled deflection roll as set forth in claim 9, wherein:
the major and minor axes are angularly displaced relative to one another at 90°.

* * * * *